G. DUNNING & P. C. HALFAKER.
Horseshoes,
No. 149,453.
Patented April 7, 1874.
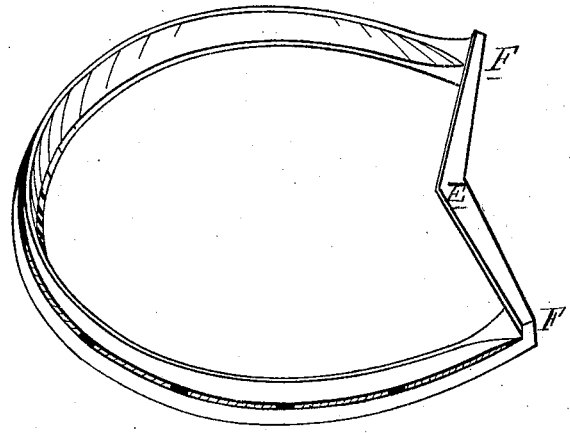

UNITED STATES PATENT OFFICE.

GERARD DUNNING AND PHILLIP C. HALFAKER, OF CHICAGO, ILLINOIS.

IMPROVEMENT IN HORSESHOES.

Specification forming part of Letters Patent No. 149,453, dated April 7, 1874; application filed May 16, 1873.

*To all whom it may concern:*

Be it known that we, GERARD DUNNING and PHILLIP C. HALFAKER, of Chicago, county of Cook and State of Illinois, have invented an Improvement in Horseshoes, of which the following is a specification:

The nature of the present invention consists in a horseshoe provided with a V-shaped frog-plate, which is attached to the under side of the heel end of the ordinary shoe, and serves the purpose of a calk and also frog-protector. In this respect the device differs from the encircling shoe or heel-bar, which does not project below the bottom of the shoe, and also differs from the two-part shoe, with overlapping heel-plate, designed for the purpose of being held to the hoof without putting nails into it, inasmuch as there is a space between the frog-plate and the hoof to allow the latter, near the frog, to be free from contact with the shoe, and inasmuch as the improvement can be attached to the ordinary shoe.

In the drawings, the figure is an inverted perspective representation of our improved horseshoe.

E represents a frog-protector, which is rigidly attached to the extreme heel of F of the shoe, and projects inward in V form, and serves the purpose of protecting the frog of the foot of the horse from injury, either by overreaching or otherwise. It will be seen that by welding the ends of the V-shaped frog-plate to the under sides of the ends of the shoe, there will be a space left between the bottom of the hoof and the frog-plate corresponding to the thickness of the shoe, thereby allowing a horse to have a free and easy movement on the shoe, not attainable when the frog-plate is placed on a level with the top of the shoe. It is well to add that the shoe thus described is designed more especially for shoeing fast horses, and experience has proven that for that purpose they are superior to other styles of shoes now in use.

We claim, and desire to secure by Letters Patent of the United States—

A horseshoe provided with a V-shaped frog-protector, attached to the under sides of the heel ends of the shoe in such manner as to leave a space between the hoof and protector, as and for the purpose described.

GERARD DUNNING.
PHILLIP C. HALFAKER.

Witnesses:
J. H. ELLIOTT,
G. L. CHAPIN.